United States Patent [19]

Gearhart

[11] Patent Number: 4,936,437

[45] Date of Patent: Jun. 26, 1990

[54] BOARD INVERTING APPARATUS

[76] Inventor: Clarence R. Gearhart, P.O. Box 1283, Brandon, Oreg. 97411

[21] Appl. No.: 294,369

[22] Filed: Jan. 9, 1989

[51] Int. Cl.$^5$ .......................................... B65G 47/248
[52] U.S. Cl. .................... 198/403; 198/401; 414/769; 414/778
[58] Field of Search ............... 198/401, 402, 403, 404, 198/413; 414/768, 769, 778, 746.4

[56] References Cited

U.S. PATENT DOCUMENTS

| | | | |
|---|---|---|---|
| 2,501,224 | 3/1950 | Kadell | 198/401 X |
| 2,564,027 | 8/1951 | Osgood | 198/401 X |
| 2,664,992 | 1/1954 | Bahney | 198/401 X |
| 2,744,639 | 5/1956 | Evans | 414/768 |
| 2,754,964 | 7/1956 | Muller | 198/403 X |
| 3,247,963 | 4/1966 | Fehely | 198/403 X |
| 3,306,427 | 2/1967 | Spencer | 198/404 |
| 3,308,969 | 3/1967 | Orms et al. | 198/403 X |
| 3,380,570 | 4/1968 | Jordan, III | 198/403 |
| 3,426,882 | 2/1969 | Korth | 198/404 |
| 4,484,675 | 11/1984 | Doherty et al. | 198/413 |

FOREIGN PATENT DOCUMENTS

| | | | |
|---|---|---|---|
| 1106483 | 12/1955 | France | 414/746.4 |
| 1225774 | 3/1971 | United Kingdom | 198/403 |

*Primary Examiner*—Robert J. Spar
*Assistant Examiner*—James R. Bidwell
*Attorney, Agent, or Firm*—James D. Givnan, Jr.

[57] ABSTRACT

A series of inverter assemblies are spaced across a board conveyor with each assembly including a plate having an abutment to arrest the board and a lifting surface. An extension on the plate provides a supplementary lifting surface and further a curved edge which stops the following board (s) during cycling of the inverter assembly. A control system includes both manually actuated switches as well as board actuated limit switches in circuit with an adjustable delay component for regulating cycling of the inverter assemblies.

9 Claims, 2 Drawing Sheets

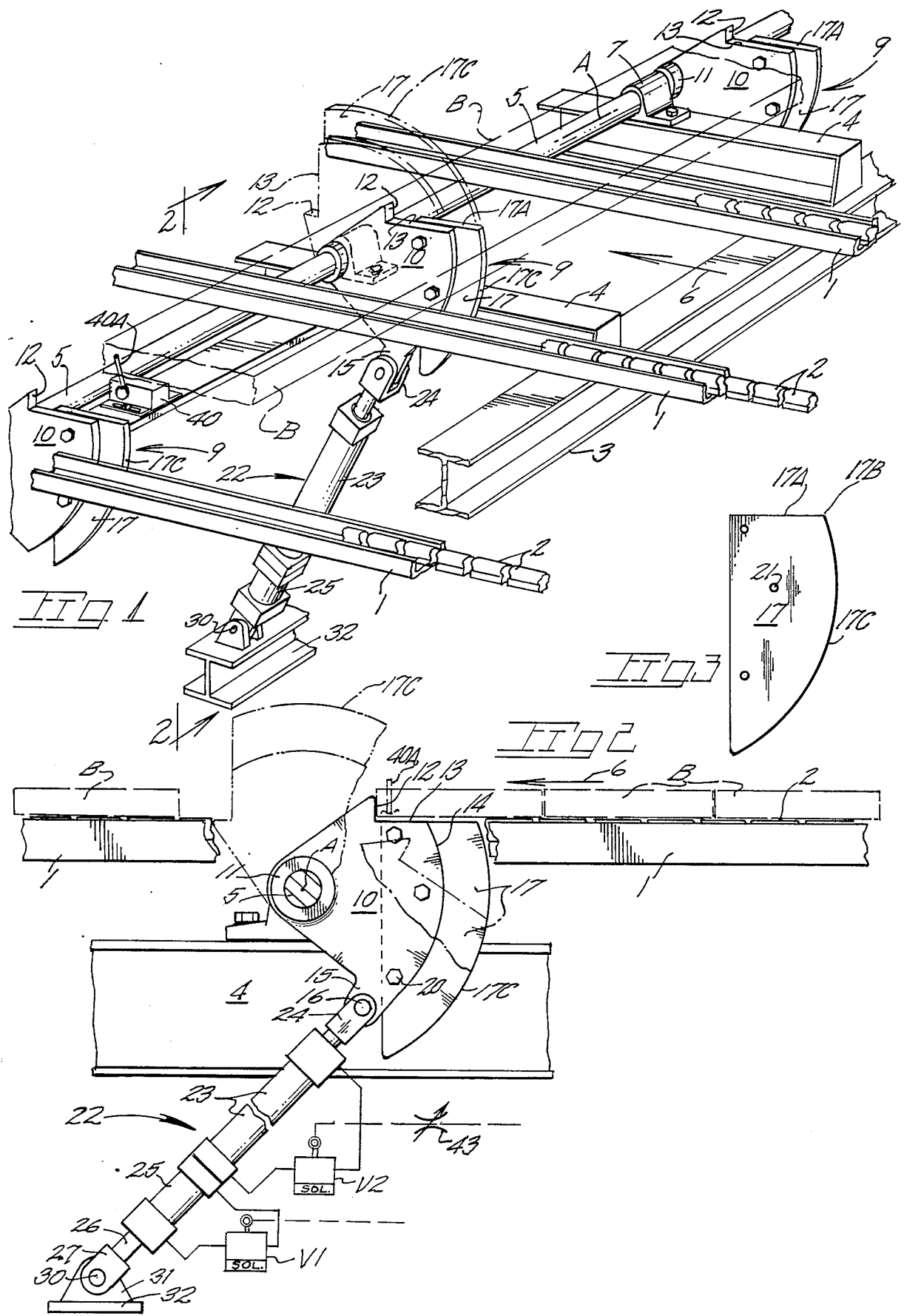

BOARD INVERTING APPARATUS

BACKGROUND OF THE INVENTION

The present invention pertains generally to an apparatus for turning boards through 180 degrees for inspection and grading purposes.

In the inspection and grading of sawn lumber, it is common practice to manually invert each board to inspect all surfaces and then stamp it with a grade mark. Turning boards to view top and bottom surfaces and edges entails considerable effort over the course of a work shift. For inspection and grading the lumber is transported on a continuously moving conveyor.

U.S. Pat. Ser. No. 4,484,675 is directed toward an apparatus for turning boards through 180 degrees against their conveyed direction of travel. An arm engages the leading edge of the board to tip same upwardly and rearwardly relative conveyor travel. In current grading operations, the spacing between successive boards and board speed is such that such rearward tipping could result in the board coming to rest on top of the following board as no provision is made for momentarily delaying the following board (s).

U.S. Pat. Ser. No. 3,426,882 is of interest in that it discloses chain carried arms which swing upwardly through a board path of a conveyor to cause board rotation. The mechanism is complex and also no provision is made for delaying the following board to prevent the turning of multiple boards.

U.S. Pat. Ser. No. 3,380,570 discloses an apparatus for inverting wood panels between a conveyor and a belt equipped tipple. The panels move into edgewise abutment with an arm assembly whereafter the arm is rotated upwardly through 90 degrees with the panel falling on to the tipple. The arms gravitate from a raised, vertical position to a position below the panel path. No provision is made for varying arm length or delaying a following panel.

By and large, boards are still manually turned in sawmills for inspection purposes which is indicative that known board turners or inverters do not accomplish the task in a suitable manner or are otherwise unacceptable for one reason or another.

SUMMARY OF THE PRESENT INVENTION

The present invention is embodied in an apparatus for inverting boards conveyed in a high speed manner with the apparatus readily adaptable to different runs of lumber of different widths.

A series of board inverting members are spaced at intervals across a grader conveyor line. For grading purposes, it is important that all surfaces of the boards be subject to view. Further, it is highly desirable that the inspection be accomplished in a rapid manner to avoid impeding lumber flow. When converting to the inspection of a new run of lumber i.e., a run of different width, it is desirable that such a conversion be accomplished in a speedy manner. Toward this end, the present series of inverters are equipped with extensions that provide an extended lifting surface to greatly increase the usefulness of the grader conveyor by rendering same adaptable to a wide range of board widths. Further, the extensions are provided with curved distal edges which momentarily stop a following board or boards while a preceding board is inverted. The extensions are sized to accommodate a range of board widths. Each inverter member includes a stop against which the leading edge of a board abuts immediately prior to board rotation. Board actuated switches permit automatic operation while foot and hand operated switches permit manual control of the apparatus. Still further, a stacked cylinder assembly permits retraction of the inverter below the path of the boards to deactivate the apparatus.

Important objectives include the provision of a board inverting apparatus capable of handling boards as rapidly as inspection may be accomplished; the provision of such an apparatus which may readily be adapted to lift and invert a wide range of board widths; the provision of such an apparatus having an inverter extension having a curved edge which serves to momentarily block successive boards following the board being inverted.

BRIEF DESCRIPTION OF THE DRAWINGS

In the accompanying drawings:

FIG. 1 is a perspective view of a position of a board conveyor with the present apparatus in combination therewith;

FIG. 2 is a vertical sectional view taken along line 2—2 of FIG. 1;

FIG. 3 is a side elevational view of an extension removed from the remaining structure of the board inverter.

DETAILED DESCRIPTION OF THE PREFERRED EMBODIMENTS

Figure 4:
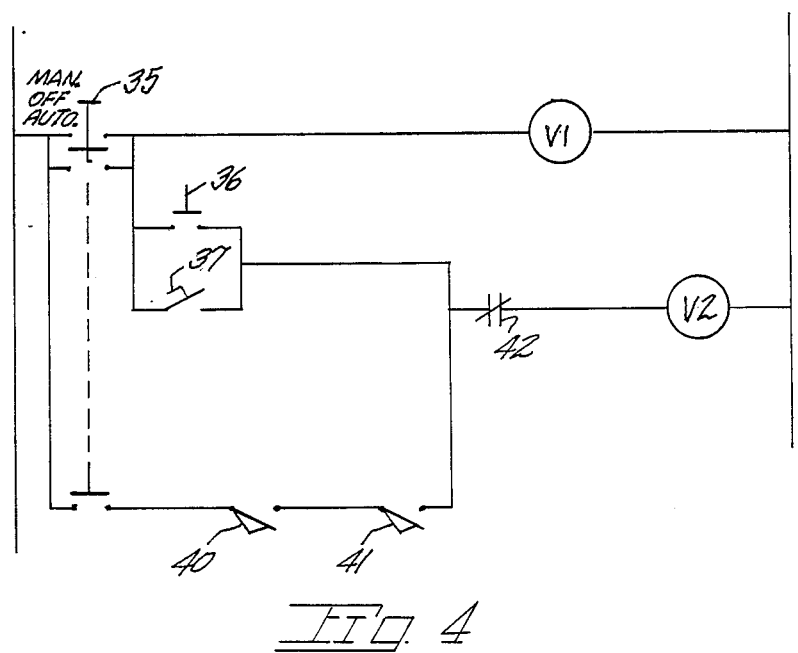
FIG. 4 is an electrical schematic.

With continuing attention to the drawings wherein applied reference numerals indicate parts similarly hereinafter identified, the reference numeral 1 indicates parallel conveyor members which serve as guides or ways for continuous conveyor chain elements 2 imparting movement to boards as at B crosswise of their major axis. Such conveyors are well-known and of the type for conveying lumber past grader personnel for inspection and the application of a grade marking to each board. Such conveyors may carry a wide array of lumber sizes varying in length, width and depth between different runs.

A conveyor frame includes welded beams as at 3 and weldments 4 thereon supported by leg members not shown. A shaft 5 is journalled in bearings 7 which locate the shaft immediately below conveyor ways 1 and transversely across the path of board travel shown by an arrow 6.

Indicated generally at 9 are board inverter assemblies which are shown as being of plate construction at 10 having sleeves 11 for inverter securement at points along shaft 5. Each inverter has an abutment or shoulder 12 against which the leading edge of a conveyed board abuts. A horizontal edge surface at 13 extends below a stopped board thereon and imparts upward movement to the board about the horizontal axis A of shaft 5. A tang 15, in one inverter assembly, receives a pin 16 for clevis attachment as explained later. An extension at 17 is mounted on inverter plate 10 and provides an upper surface 17A which supplements horizontal edge surface 13. An extremity 17B of surface 17A accordingly is positioned at a point to assure a major segment of board width is engaged by combined surfaces 13 and 17A to assure lifting of a board thereon without fore or aft tipping of the board even when a board trailing edge is abutted by a following board.

Extension attachment is by removable threaded fastener assemblies at 20 passing through openings 21. A distal edge 17C is preferably arcuate and formed about axis A and blocks or restrains the following board during a cycle of inverter operation.

Actuator means includes a tandem air cylinder assembly generally at 22. A cylinder 23 includes a piston rod end fitted with a clevis 24 receiving pin 16. Cylinder 23 is of the double acting type with a stroke sufficient to rotate the inverter assembly through approximately ninety degrees to the double dot broken line position of FIG. 2. A tandemly coupled cylinder at 25 is also of the double acting type with a piston rod 26 equipped with a clevis 27 pinned at 30 to an ear 31 on a conveyor frame member 32. Tandem cylinder 25 serves to downwardly retract the inverter assembly (and like assemblies along shaft 5) to the single dot broken line position of FIG. 2 to permit the conveyor to operate independently of the inverter assemblies with board turning being done manually.

Control means for the apparatus includes solenoid operated valves V1 and V2 serving double acting air cylinders 25 and 23. A three position control switch 35 in FIG. 4 is positionable to render the control means manual or automatic. In the manual mode either a hand operated switch 36 or a foot operated switch 37 may establish a circuit including solenoid valve V2 serving air cylinder 23. Automatic operation of the apparatus by repositioning of switch 35 involves a pair of limit switches 40 and 41, one of which is typically shown in FIG. 1 located so as to be closed by the leading edge of a board displaying a switch finger as at 40A. An adjustable time delay at 42 permits the control means for valve V2 to be adapted to cycle at an optimum interval for visual inspection purposes. Further, the solenoid valve V2 is provided with an adjustable air source including a pressure regulator 43 to enable inverter speed to be set to compensate for inverting differently sized boards.

With attention again to extension 17, it has been determined that by providing a combined overall length of surfaces 13 and 17A of seven and one-half inches an apparatus may turn boards up to fourteen inches in width. The combined length should not exceed board width.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A board turning apparatus comprising, conveyor means for moving boards transversely of their length along a path, inverter assemblies spaced at intervals across the path of the boards and including a plate member having an upright surface and a substantially horizontal edge surface serving respectively to arrest board movement and subsequently impart lifting movement to the board, an extension on said plate member and having a board engaging surface substantially coplanar with said horizontal edge surface of said plate member and serving to extend same, removable attachment means permitting attachment of said extension to said plate member to permit a range of board widths to be turned, said extension additionally including a curved distal edge for travel about said horizontal axis, said distal edge constituting a stop for a following board during movement of the plate member and extension thereon, pivot means having a horizontal axis and on which said inverter assemblies are mounted, actuator means coupled to said pivot means for imparting cyclic rotation to same through approximately ninety degrees, and control means for energizing said actuator means.

2. The apparatus claimed in claim 1 wherein said distal edge of the extension is an arc formed about said horizontal axis of the pivot means.

3. The apparatus claimed in claim 1 wherein said actuator means additionally functions to retract the plate member and extension thereon below the board path to an inoperable position.

4. The apparatus claimed in claim 1 wherein said actuator means includes an air cylinder of the double acting type, a solenoid valve serving said air cylinder, delay means in circuit with said valve settable to regulate the interval between extension and retraction of said cylinder.

5. A board turning apparatus enabling inspection of both sides and edges of a board and comprising, conveyor means for moving boards transversely along a path, pivot means having an axis disposed crosswise below said conveyor means, inverter assemblies on said pivot means each including a member having an upright surface disposed for contact by the leading edge of a conveyed board to stop same and a horizontal surface, an extension carried by said member and having a board lifting surface engageable with the underside of the stopped board, said extension and said member adapted for arcuate cyclic travel about said pivot means so as to lift the board and to advance same in the path direction, said extension having a distal edge concentric with the axis of said pivot means for stopping a succeeding board during extension travel, actuator means coupled to said pivot means to impart arcuate cyclic movement thereto, and control means for energizing said actuator means.

6. The apparatus claimed in claim 5 wherein said distal edge is formed on an arc.

7. The apparatus claimed in claim 5 wherein said actuator means includes an air cylinder coupled to one of said inverter assemblies, said control means including manually operable switches and board actuated limit switches in parallel.

8. The apparatus claimed in claim 7 wherein said cylinder is of the double acting type, a solenoid valve serving said cylinder, delay means in circuit with said valve settable to regulate the cycling rate of the cylinder and hence the cycling rate of the inverter assemblies.

9. The apparatus claimed in claim 5 additionally including removable attachment means joining said extension to said member.

* * * * *